US012504349B2

(12) United States Patent
Rathi et al.

(10) Patent No.: US 12,504,349 B2
(45) Date of Patent: Dec. 23, 2025

(54) PRESCRIPTION LENS ENROLLMENT AND SWITCHING FOR OPTICAL SENSING SYSTEMS (71) Applicant: Apple Inc., Cupertino, CA (US)

(72) Inventors: Anup Rathi, Milpitas, CA (US); Julia Benndorf, Mountain View, CA (US); Zeyad Zaky, Mountain View, CA (US); Katharina Buckl, Bavaria-Bayern (DE); Duncan A. Mcroberts, Boulder, CO (US)

(73) Assignee: Apple Inc., Cupertino, CA (US)

( * ) Notice: Subject to any disclaimer, the term of this patent is extended or adjusted under 35 U.S.C. 154(b) by 369 days.

(21) Appl. No.: 18/332,536

(22) Filed: Jun. 9, 2023

(65) Prior Publication Data
US 2023/0417627 A1 Dec. 28, 2023

Related U.S. Application Data (60) Provisional application No. 63/367,114, filed on Jun. 27, 2022.

(51) Int. Cl.
*G01M 11/02* (2006.01)
*A61B 3/10* (2006.01)
(Continued)

(52) U.S. Cl.
CPC .......... *G01M 11/0235* (2013.01); *A61B 3/10* (2013.01); *G02B 27/0101* (2013.01);
(Continued)

(58) Field of Classification Search
CPC ......... G01M 11/0235; G01M 11/0228; G01M 11/0221; G01M 11/02; G02C 13/003; G02C 13/00; G02C 7/086; G02C 7/088; G06T 7/70; G06T 7/246; A61B 3/028; A61B 3/04; A61B 3/10; A61B 3/02; A61B 3/103; G02B 27/00; G02B 27/0101;
(Continued)

(56) References Cited

U.S. PATENT DOCUMENTS 10,827,918 B1 * 11/2020 Nuriel ...................... A61B 3/08
11,269,406 B1   3/2022 Sztuk et al.
(Continued)

OTHER PUBLICATIONS

Non-Final Office Action received for U.S. Appl. No. 18/356,767, mailed on Jul. 21, 2025, 12 pages.

*Primary Examiner* — Cara E Rakowski
*Assistant Examiner* — Kuei-Jen L Edenfield
(74) *Attorney, Agent, or Firm* — Kubota & Basol LLP (57) ABSTRACT A system can perform a method to identify when one or more lenses are the wrong prescription for the user. In some embodiments, the system notifies the user to switch prescription lenses or initiates an enrollment process for the lenses. In some embodiments, the system can identify the prescription of a lens and compare the identified prescription to one or more enrolled prescriptions for the user (e.g., previously defined in user settings associated with user profile). When the identified prescription of the lens does not match an expected enrolled prescription for the user), the system can notify the user to switch prescription lenses. When there are no enrolled prescriptions for the user, the device can prompt the user to enroll the lens.

20 Claims, 6 Drawing Sheets (51) Int. Cl.
*G02B 27/01* (2006.01)
*G02C 7/08* (2006.01)
*G02C 13/00* (2006.01)
*G06T 7/70* (2017.01)

(52) U.S. Cl.
CPC ......... *G02B 27/0172* (2013.01); *G02C 7/086* (2013.01); *G02C 7/088* (2013.01); *G02C 13/003* (2013.01); *G06T 7/70* (2017.01); *G02B 2027/0156* (2013.01); *G02B 2027/0178* (2013.01)

(58) Field of Classification Search
CPC .............. G02B 27/017; G02B 27/0172; G02B 2027/0156; G02B 2027/0178; G16H 30/20; G16H 30/40
USPC ................................................. 351/205–222
See application file for complete search history.

(56) References Cited

U.S. PATENT DOCUMENTS

| | | |
|---|---|---|
| 2016/0216801 A1 | 7/2016 | Shedletsky et al. |
| 2017/0112057 A1 | 4/2017 | Loukili et al. |
| 2018/0035088 A1 | 2/2018 | Nose |
| 2019/0125183 A1* | 5/2019 | Lane ................... A61B 3/0025 |
| 2022/0192483 A1* | 6/2022 | Lee ..................... A61B 3/0041 |
| 2023/0200639 A1* | 6/2023 | Yehezkel ............ A61B 3/0041 351/222 |
| 2024/0029395 A1 | 1/2024 | Rathi et al. |

\* cited by examiner

PRESCRIPTION LENS ENROLLMENT AND SWITCHING FOR OPTICAL SENSING SYSTEMS

CROSS-REFERENCE TO RELATED APPLICATIONS

This application claims the benefit of U.S. Provisional Application No. 63/367,114, filed Jun. 27, 2022, the content of which is incorporated herein by reference in its entirety for all purposes.

FIELD OF THE DISCLOSURE

This relates generally to user enrollment of prescription lenses in optical sensing systems, and more particularly to ensuring that the correct prescription lenses for a particular user are enrolled and utilized within the optical sensing system.

BACKGROUND OF THE DISCLOSURE

Prescription lenses may have a significant effect on user experience when utilizing an optical sensing system. For example, viewing an optical system without a prescription lens or with the wrong prescription lens can result in blurred images, which can negatively impact user experience.

SUMMARY OF THE DISCLOSURE

This relates to systems and methods for ensuring that the correct prescription lenses for a particular user are enrolled and utilized within the optical sensing system. A user can insert prescription lenses into an optical sensing system (e.g., between the user's eyes and an internal display of the optical sensing system) to correct the user's vision without wearing eyeglasses. However, inserting incorrect prescription lenses can degrade performance of an optical sensing system. In some embodiments, the system performs a method to identify when one or more lenses are the wrong prescription for the user. In some embodiments, the system notifies the user to switch prescription lenses or initiates an enrollment process for the lenses. In some embodiments, the system can identify the prescription of a lens and compare the identified prescription to one or more enrolled prescriptions for the user (e.g., previously defined in user settings associated with user profile). When the identified prescription of the lens does not match an expected enrolled prescription for the user (e.g., a user-specified prescription), the system can notify the user to switch prescription lenses. When there are no enrolled prescriptions for the user, the device can prompt the user to enroll the lens.

In some embodiments, at an electronic device in communication with a display and an optical sensing system, one or more lens characteristics of a first attachable lens can be determined using measurements by the optical sensing system. The one or more lens characteristics can include a diopter characteristic. In some embodiments, in accordance with a determination that the diopter characteristic of the first attachable lens is outside a threshold of a first user-specified (e.g., predetermined) diopter characteristic: in accordance with a determination that the diopter characteristic of the first attachable lens matches or is within a threshold of an additional user-specified diopter characteristic: the user-specified diopter characteristic for the system can be switched from the first user-specified diopter characteristic to the additional user-specified diopter characteristic. In some embodiments, in accordance with a determination that the diopter characteristic of the first attachable lens is outside a threshold of a first user-specified diopter characteristic: in accordance with a determination that the diopter characteristic of the first attachable lens is outside the threshold of the additional user-specified diopter characteristic: a lens enrollment process can be initiated for the first attachable lens.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to systems and methods for ensuring that the correct prescription lenses for a particular user are enrolled and utilized within the optical sensing system. A user can insert prescription lenses into an optical sensing system (e.g., between the user's eyes and an internal display of the optical sensing system) to correct the user's vision without wearing eyeglasses. However, inserting incorrect prescription lenses can degrade performance of an optical sensing system. In some embodiments, the system performs a method to identify when one or more lenses are the wrong prescription for the user. In some embodiments, the system notifies the user to switch prescription lenses or initiates an enrollment process for the lenses. In some embodiments, the system can identify the prescription of a lens and compare the identified prescription to one or more enrolled prescriptions for the user (e.g., previously defined in user settings associated with user profile). When the identified prescription of the lens does not match an expected enrolled prescription for the user (e.g., often referred to herein as a predetermined prescription or a user-specified prescription), the system can notify the user to switch prescription lenses. When there are no enrolled prescriptions for the user, the device can prompt the user to enroll the lens.

In some embodiments, at an electronic device in communication with a display and an optical sensing system, one or more lens characteristics of a first attachable lens can be determined using measurements by the optical sensing system. The one or more lens characteristics can include a diopter characteristic. In some embodiments, in accordance with a determination that the diopter characteristic of the first attachable lens is outside a threshold of a first user-specified diopter characteristic: in accordance with a determination that the diopter characteristic of the first attachable lens matches or is within a threshold of an additional user-specified diopter characteristic: the user-specified diopter characteristic for the system can be switched from the first user-specified diopter characteristic to the additional user-specified diopter characteristic. In some embodiments, in accordance with a determination that the diopter characteristic of the first attachable lens is outside a threshold of a first user-specified diopter characteristic: in accordance with a determination that the diopter characteristic of the first attachable lens is outside the threshold of the additional user-specified diopter characteristic: a lens enrollment process can be initiated for the first attachable lens.

Figure 1:
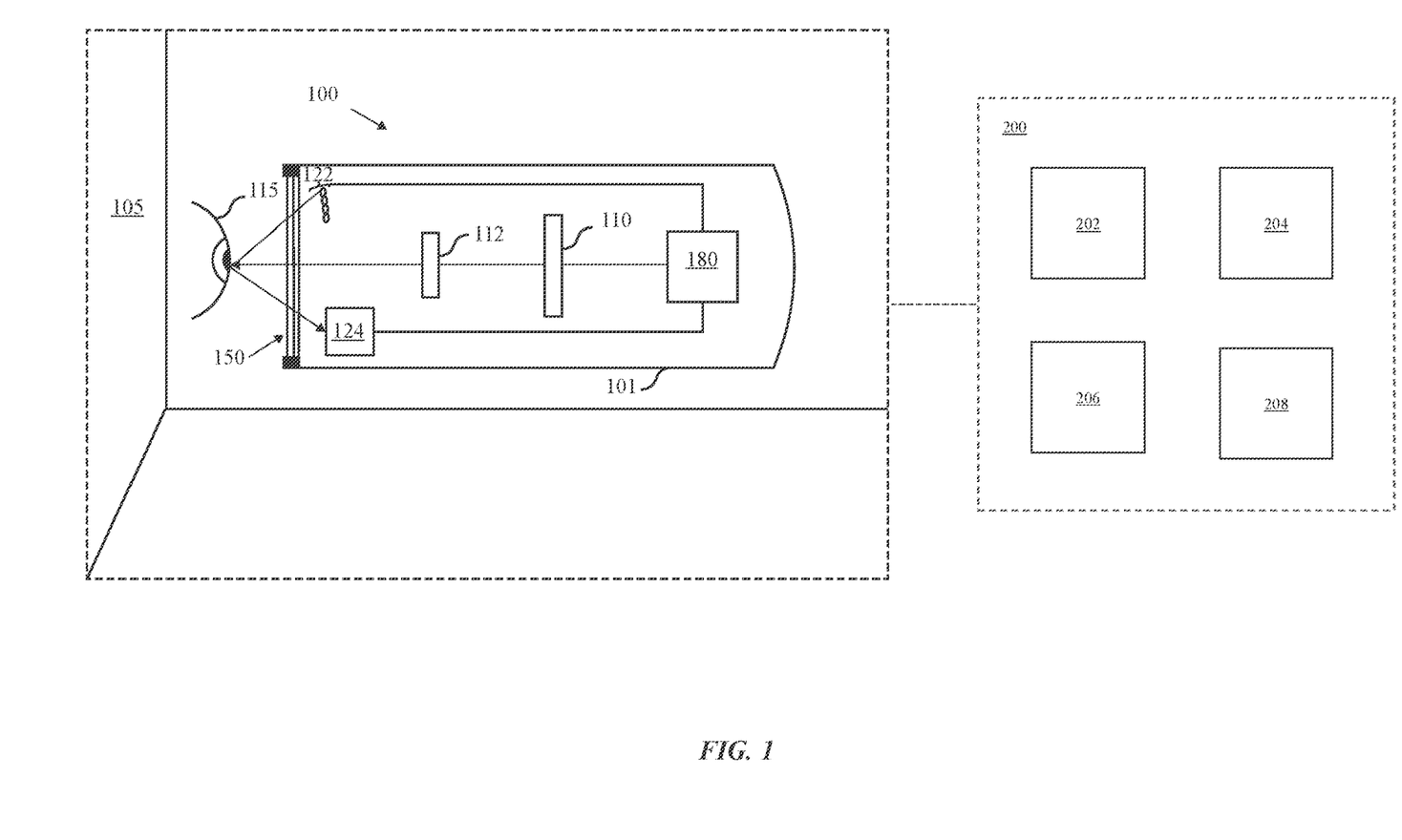
FIG. 1 illustrates a block diagram of an exemplary optical sensing system according to some embodiments of the disclosure.

FIG. 1 illustrates a block diagram of an exemplary optical sensing system 100 according to some embodiments of the disclosure. The optical sensing system 100 can include a housing 101 (or enclosure) that contains various components, and can be in communication with an electronic device. In some embodiments, the optical sensing system 100 can be a head-mounted device and the housing 101 can be configured to rest against a face of a user 115 to keep the optical sensing system 100 in a relatively fixed position on the face of the user 115 (e.g., surrounding the eyes of the user 115). In other embodiments, the optical sensing system 100 can be glasses, goggles, a visor, a mask, a helmet, or other head-mounted device. The housing 101 can include a display 110 that displays an image, emitting light towards or onto the eye of the user 115. In various embodiments, the display 110 can emit the light through an eyepiece having one or more lenses 112 that refracts the light emitted by the display 110, making the display appear to the user 115 to be at a virtual distance farther than the actual distance from the eye to the display 110. To enable user focus on the display 110, in various embodiments the virtual distance can be at least greater than a minimum focal distance of the eye (e.g., 7 cm). Further, in order to provide a better user experience, in some embodiments, the virtual distance can be greater than 1 meter.

The housing 101 can also contain a tracking system including one or more light sources 122, image sensor 124, and a controller 180. The controller 180 can include one or more processing components (e.g., a CPU or a DSP) for processing various functions for the optical sensing system 100. The one or more light sources 122 can emit light onto the eye of the user 115 that reflects as a light pattern (e.g., one or more glints such as a circle) that can be detected by the image sensor 124 (e.g., camera). Based on the light pattern, the controller 180 can determine the presence of a lens and/or characteristics of the lens (e.g., prescription). In some embodiments, the one or more light sources 122 can emit light onto the eye of the user to illuminate the eye, and images of the eye can be processed by controller 180 to determine an eye tracking characteristic of the user 115. For example, the controller 180 can determine a gaze direction of one or both eyes of the user 115. In another example, the controller 180 can determine a blinking state (eyes open or eyes closed) of the user 115. As yet another example, the controller 180 can determine saccadic movements, a pupil center, a pupil size, or a point of regard. In some embodiments, the light from the eye of the user 115 can be reflected off a mirror or passed through optics such as lenses or an eyepiece before reaching the image sensor 124.

In some embodiments, the display 110 can emit light in a first wavelength range, the one or more light sources 122 can emit light in a second wavelength range, and the image sensor 124 can detect light in the second wavelength range. In some embodiments, the first wavelength range can be a visible wavelength range (e.g., a wavelength range within the visible spectrum of approximately 400-700 nm), and the second wavelength range can be a near-infrared wavelength range (e.g., a wavelength range within the near-infrared spectrum of approximately 700-1400 nm), or any other wavelength range outside of the visible light wavelength range. In some embodiments, the light source 122 and the image sensor 124 can use overlapping wavelengths when illuminating the eye for eye/gaze tracking. Alternatively, the light source 122 and the image sensor 124 can use the same spectrum to illuminate the eye for eye/gaze tracking while the user 115 is looking at the display 110 showing content within the visible spectrum.

As shown in FIG. 1, a lens 150 can be removably or permanently attached to the optical sensing system 100. In some embodiments, the lens 150 can be attached using the housing 101 of the optical sensing system 100. Lens 150 can include any suitable transparent lens for altering a perception of images appearing on the display 110 as seen by the user's eyes. For instance, lens 150 can be a corrective lens that has a diopter, e.g., prescription, for correcting the user's vision. In such configurations, the lens 150 can help the user 115 see images appearing on the display 110 with improved clarity and sharpness. However, for the optical sensing system 100 to accurately provide content for the user 115, the optical sensing system 100 may need to know the prescription of (or other information about) the lens 150. One way for the optical sensing system 100 to access information about the lens 150 is to detect reflections of light generated at the one or more light sources 122 caused by a first surface (e.g., front surface) and/or a second surface (e.g., back surface) of the lens 150. In some embodiments, the reflections of the one or more light sources 122 caused by the lens 150 can be detected using a sensor in the optical sensing system 100 such as the image sensor 124. For example, the reflections of the one or more light sources 122 caused by lens surfaces can be captured by the image sensor 124, and the information contained therein can be decoded by the controller 180 and used to modify operations of the optical sensing system 100, as will be discussed herein with respect to FIG. 2.

In some embodiments, the light sources 122 can generate light that reflects off the front surface and/or the back surface of the lens 150. The light sources 122 can be light emitting diodes (LEDs) or any other suitable light emitting source. In some embodiments, a pattern of reflections off the lens can be detected in one or more images taken by the image sensor 124 when the eye tracking functionality is not being used. In one embodiment, the pattern of reflections off the lens can be detected when eye tracking is enabled, and content is displayed (or not displayed) in a specific area of the display 110.

In various embodiments, the image sensor 124 can be a frame/shutter-based camera that, at a particular point in time or multiple points in time at a particular frame rate, captures an image of the eye of the user 115. Each image can include a matrix of pixel values corresponding to locations of a matrix of light sensors of the camera.

In some embodiments, the image sensor 124 can have a single field of view (FOV) that is used for both eye tracking functionality and detection of lens characteristics of the lens 150. In other embodiments, the image sensor 124 can have multiple FOVs with differing parameters such as size, magnification, or orientation with respect to the lens 150. The image sensor can have a first FOV used for eye tracking and a second, different FOV used for detection of the lens characteristics of the lens 150.

In some embodiments, the optical sensing system 100 can be communicatively coupled to device 200, which can be a smart phone, a tablet computer, a laptop computer, or any other suitable portable or non-portable electronic device that is separate from the optical sensing system 100. For example, device 200 and optical sensing system 100 can each include communication circuitry (e.g., wireless communication circuitry) to enable communication therebetween. However, in other embodiments, the functionality of device 200 and optical sensing system 100 can be integrated into a single electronic device.

In some embodiments, device 200 can include one or more display generation components such as display 202, one or more processors 204, one or more memories 206, one or more input devices 208 (e.g., touch sensor panels, trackpads, buttons, joysticks, microphones, etc.), and other components (e.g., wired or wireless communication circuitry, output devices such as speakers, tactile feedback generators, etc.). One or more communication buses not shown in FIG. 1 can optionally be used for communication between the aforementioned components within device 200.

In some embodiments, processors 204 can include one or more general purpose processors, one or more graphics processors, and/or one or more digital signal processors (DSPs). In some embodiments, memory 206 can be a non-transitory computer-readable storage medium (e.g., flash memory, random access memory, or other volatile or non-volatile memory or storage) that stores computer-readable instructions configured to be executed by processors 204 to perform the techniques, processes, and/or methods described herein. In some embodiments, memory 206 can include a non-transitory computer-readable storage medium. A non-transitory computer-readable storage medium can be any medium (e.g., excluding a signal) that can tangibly contain or store computer-executable instructions for use by or in connection with the instruction execution system, apparatus, or device. The non-transitory computer-readable storage medium can include, but is not limited to, magnetic, optical, and/or semiconductor storage. Examples of such storage include magnetic disks, optical discs based on CD, DVD, or Blu-ray technologies, as well as persistent solid-state memory such as flash, solid-state drives, and the like.

In some embodiments, display 202 can include a single display (e.g., a liquid-crystal display (LCD), organic light-emitting diode (OLED), or other types of display). In some embodiments, display 202 can include multiple displays. In some embodiments, display 202 can include a display with a touch-sensitive surface (e.g., a touch screen), a projector, a holographic projector, a retinal projector, etc.

Figure 2:
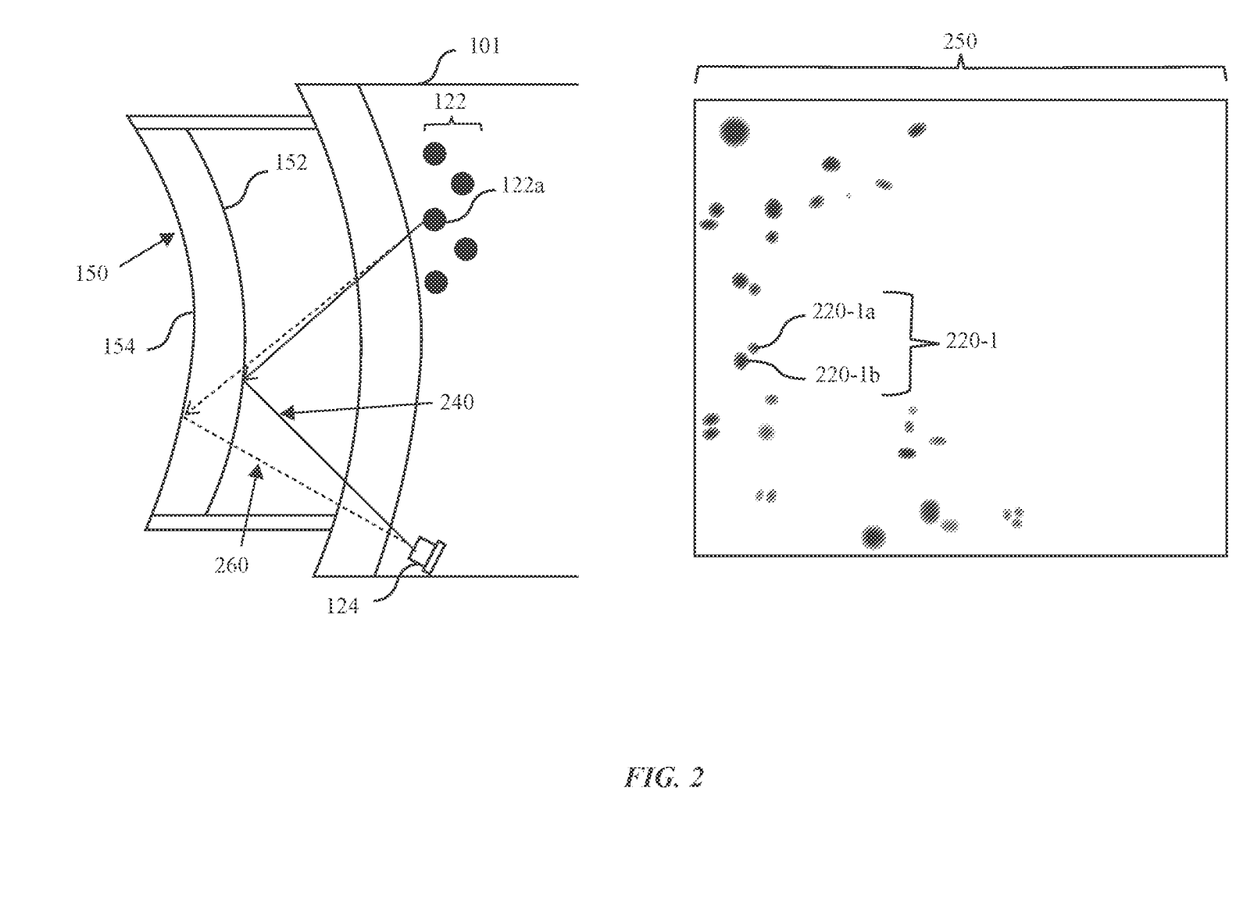
FIG. 2 illustrates an exemplary image including reflections of light sources off a lens according to some embodiments of the disclosure.

FIG. 2 illustrates an exemplary image 250 including reflections of light sources 122 off the lens 150 according to some embodiments of the disclosure. The reflections of light sources 122 can include reflections off a front surface 152 and a back surface 154 of the lens 150. Pairs of reflections off the front surface 152 and the back surface 154 of the lens 150 can be detectable in the image 250 captured by the image sensor 124. For example, FIG. 2 illustrates a light path 240 for light from an exemplary light source 122a being reflected from the front surface 152 of the lens 150 to the image sensor 124 and detected as reflection 220-1a. FIG. 2a also illustrates a light path 260 for light from light source 122a being reflected from the back surface 154 of the lens 150 to the image sensor 124 and detected as reflection 220-1b. Reflection 220-1a and reflection 220-1b can form a pair of reflections (collectively, reflections 220-1) that correspond to a single light source. Pairs of reflections corresponding to a single light source can be detected based on their spatial relationship (e.g., nearness) to one another in the image 250.

In some embodiments, a pattern of the reflections of the light sources 122 caused by the lens 150 in the image 250 captured by the image sensor 124 can be used to determine a characteristic of the lens 150 used by the optical sensing system 100. For example, the pattern of the reflections in the image 250 can be used to determine the prescription parameters (e.g., diopters of nearsightedness or farsightedness, diopters of astigmatism, etc.) of the lens 150. The pattern of the reflections of the light sources 122 can additionally or alternatively be used to determine a position or orientation (e.g., three-dimensional (3D) position and three orientations) of the lens 150 in the optical sensing system 100.

Figure 3:
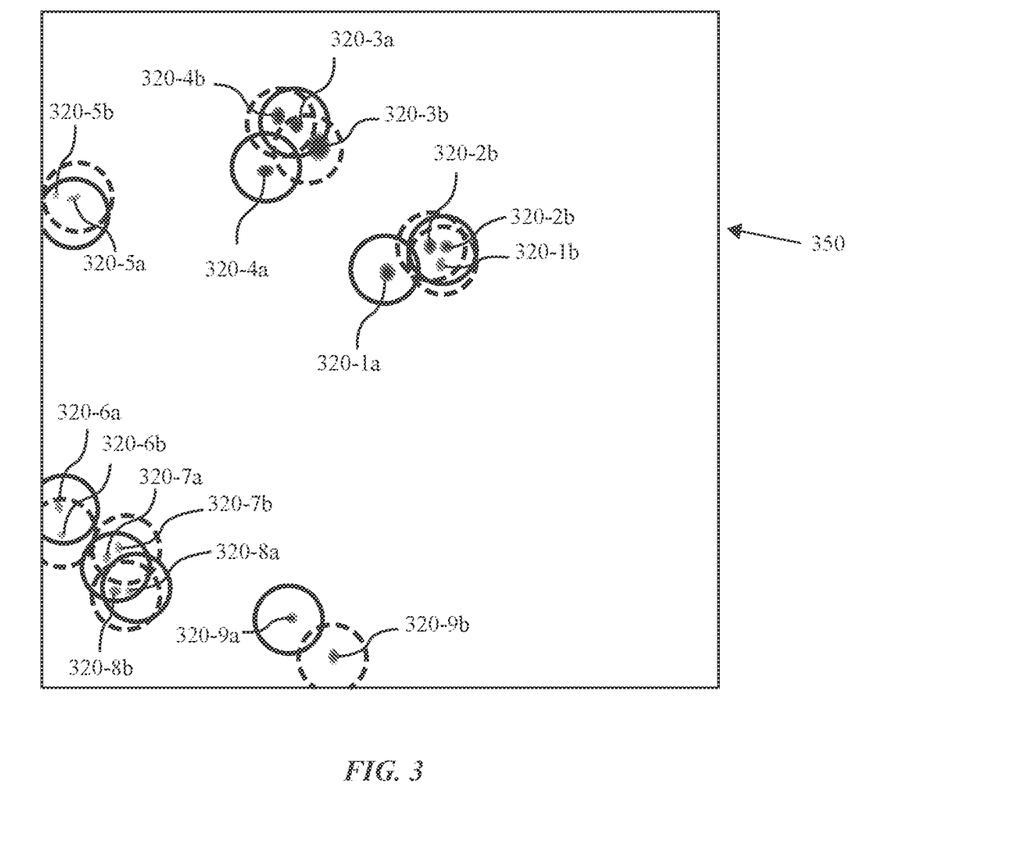
FIG. 3 illustrates an exemplary image, including reflections of light sources off a lens, according to some embodiments of the disclosure.

FIG. 3 illustrates an exemplary image 350, including reflections of light sources off a lens, according to some embodiments of the disclosure. In the example of FIG. 3, a pattern of nine pairs of reflections 320-1, 320-2, . . . , 320-9 caused by nine light sources 122 can be captured in a portion of an image 350 from the image sensor 124. Note that reference numbers 320-1a, 320-1b, etc. in FIG. 3 point to the centroids of the actual reflections which are indicated by the surrounding solid or dashed line circles around the centroids. Reflections 320-1b, 320-2b, . . . 320-9b (e.g., the reflections inside the dashed circles) can be reflections from the back surface of the lens 150 while reflections 320-1a, 320-2a, . . . , 320-9a (e.g., the reflections inside the solid circles) can be reflections from the front surface of the lens 150. The pattern of the reflections can depend on one or more of the diopter of the lens 150, characteristics of the light sources 122, and the 3D spatial arrangement between the light sources 122, the lens 150, and the image sensor 124. Because different lens diopters will result in different patterns of reflections, a detected pattern can be used to detect the diopter of the lens 150 attached to the optical sensing system 100. Exemplary diopters can range from 0 to −9 or more for nearsightedness, and 0 to 4 or more for astigmatism.

In some embodiments, the pattern of the reflections (e.g., arrangement of pairs of reflections) used to determine the lens characteristics (e.g., diopters) of the lens 150 is based on a center point or a centroid of each of the reflections. In some embodiments, the pattern may be detected based on one or more of the positions, intensities, and shapes of the reflections in one or more images.

In some embodiments, the 3D spatial arrangement between the light sources 122 and the image sensor 124 can be known or predetermined (e.g., based on factory calibration). Further, a nominal position of the lens 150 can be estimated and then used to determine the actual pose (e.g., 3D position and orientation) of the lens 150. The accuracy of the lens characteristics determination may be improved by using actual (e.g., measured rather than general device configuration data) information about the spatial arrangement between the light sources 122, the image sensor 124, and the lens 150. A device configuration assessment may be based on assigning each reflection in the pattern to a respective light source of the light sources 122 and a front surface or a back surface of the lens 150.

In some embodiments, an algorithm or machine learning (ML) model can receive an image of the reflections and output the lens characteristics. A ML model can be trained using ground truth images (e.g., simulated or actual) generated for a specific device configuration, e.g., a specific arrangement of known light sources (e.g., type, intensity, position, orientation, etc.), a specific image sensor (e.g., type, position, orientation, resolution, etc.), and a specific lens (e.g., type, material, shape, etc.). Ground truth images for a range of lens characteristics (e.g., diopters) can be used to train the ML network. Once trained, one or more images of an attached lens can be input to the ML network and the corresponding determined lens characteristic can be output. In some embodiments, the ML network can be trained to output the lens characteristic and a corresponding confidence measurement. The ML model can be, but is not limited to being, a deep neural network (DNN), an encoder/decoder neural network, a convolutional neural network (CNN), or a generative adversarial neural network (GANN). The ML model can run on the optical sensing system 100, such as at controller 180 in FIG. 1, or alternatively on an electronic device in communication with an optical sensing system, such as device 402 in communication with system 100 as shown in FIG. 4, or in some embodiments on a combination of both the optical sensing system 100 and the device 402.

In some embodiments, the optical sensing system 100 uses the lens characteristic(s) determined based on the pattern of reflections off surfaces of the lens 150 to adjust rendering processes for the display 110, for example, to reduce or correct distortion. In another example, minor displacements (e.g., to the right, left, up, or down) of the spatial positioning of the lens 150 can be identified from the pattern of reflection off the lens 150 and corrected using rendering processes of the display 110. Alternatively, a warning to re-attach or -reinsert the lens 150 can be provided when a large displacement (e.g., over a threshold) of the spatial positioning of the lens 150 is detected. In some embodiments, the lens characteristic(s) may be stored for future use.

Figure 4:
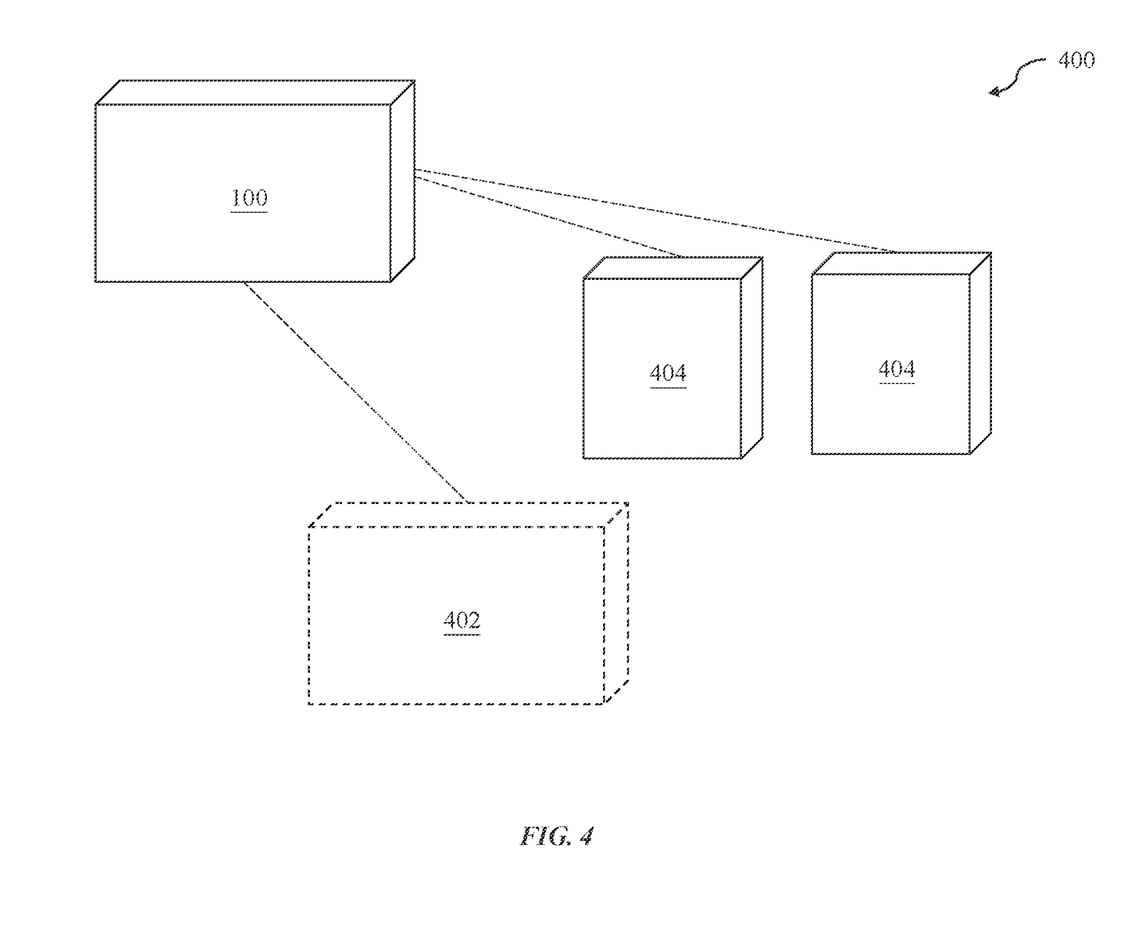
FIG. 4 illustrates an example symbolic hardware diagram of a system for detecting ocular events according to some embodiments of the disclosure.

FIG. 4 illustrates an example symbolic hardware diagram of a system 400 for detecting ocular events according to some embodiments of the disclosure. In some embodiments, system 400 can represent an electronic device that includes and is in communication with optical sensing system 100, which can be a wearable device such as glasses, goggles, a visor, a mask, a helmet, or other head-mounted device. In some embodiments, optical sensing system 100 can be communicatively coupled to device 402, which can be a smart phone, a tablet computer, a laptop computer, an auxiliary device in communication with another device, a wearable host device, etc. In some embodiments, optical sensing system 100 can additionally or alternatively be communicatively coupled to one or more devices 404, which can be accessory devices such as a pointing device, handheld touch controllers, gloves, etc. In some embodiments, system 400 can comprise only a single optical sensing system 100 (and optional accessory devices 404), with the functionality of device 402 included in optical sensing system 100.

Figure 5A:
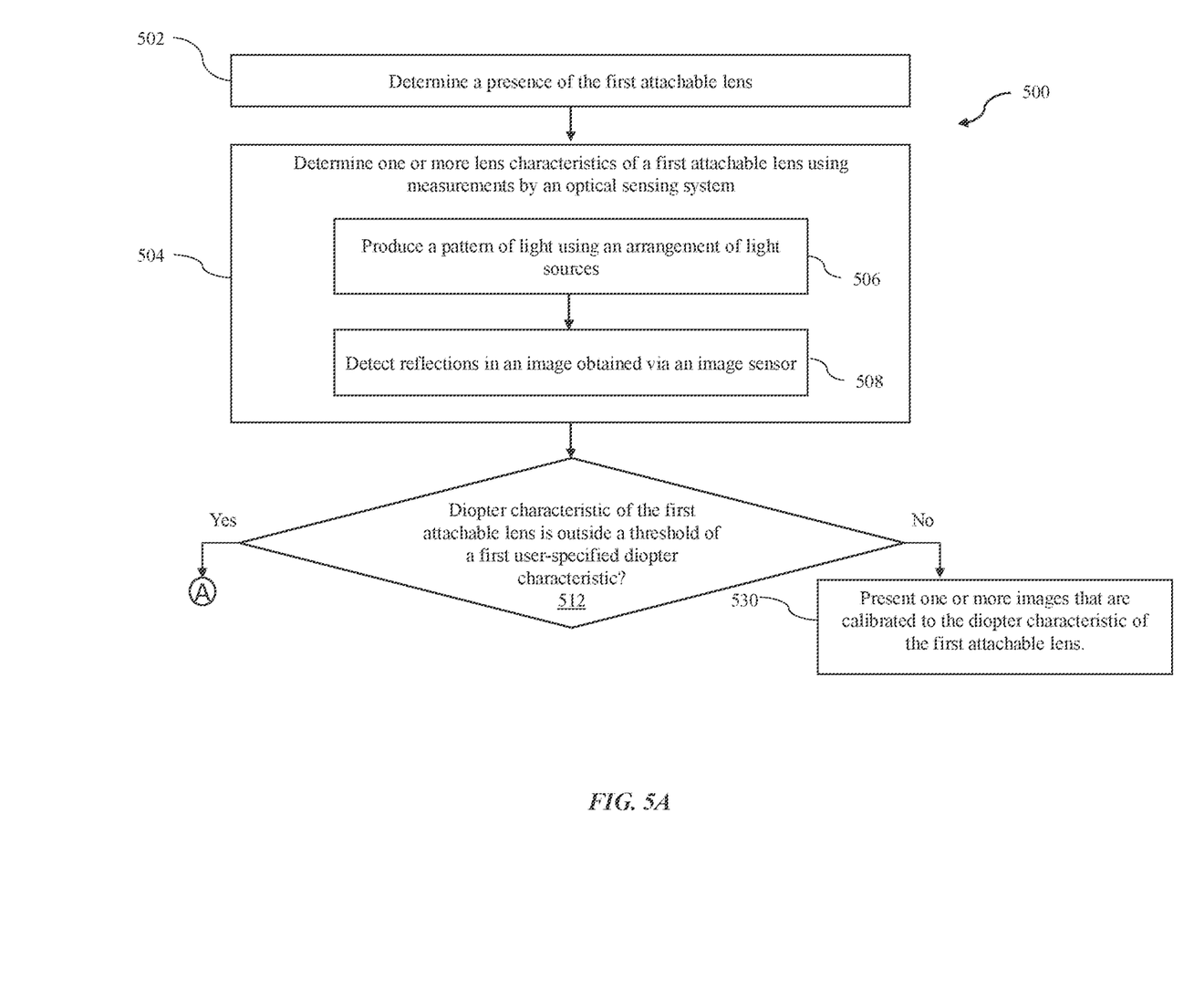
FIGS. 5A-5B illustrate an example flowchart of a method for enrolling prescription lenses on an optical sensing system according to some embodiments of the disclosure.
Figure 5B:
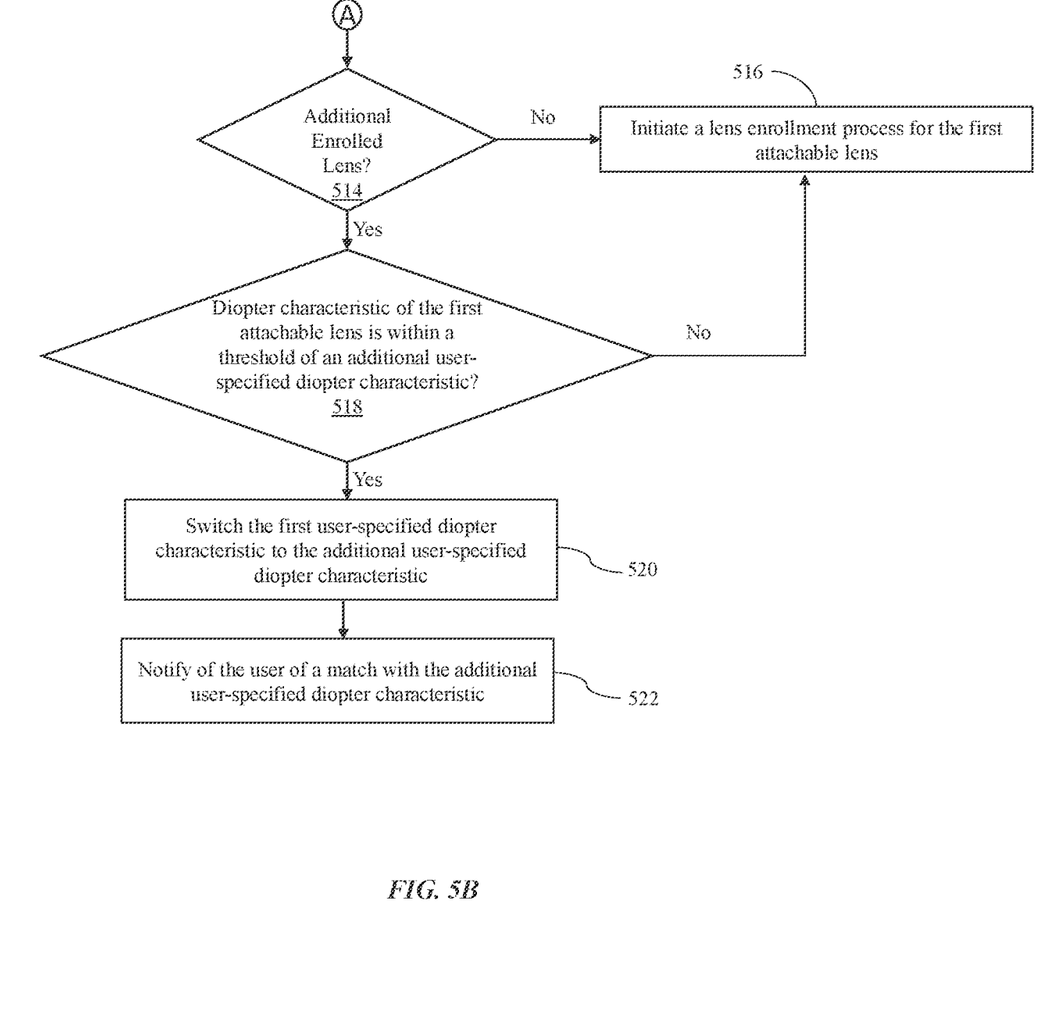

FIGS. 5A-5B illustrate an example flowchart of a method 500 for enrolling prescription lenses on an optical sensing system according to some embodiments of the disclosure. The method 500 can be performed at the optical sensing system 100 of FIG. 1 (e.g., using controller 180), or alternatively at an electronic device in communication with an optical sensing system, such as device 200 in communication with system 100 as shown in FIG. 1, or in some embodiments a combination of both the optical sensing system 100 and the device 200. Some of the operations in method 500 can be optionally combined or omitted, and the order of some operations can be optionally changed.

As described below, method 500 provides an efficient way to enroll prescription lenses at an optical sensing system and thereby improve user experience. Prescription lenses can be attached (e.g., clipped on, inserted into a slot, or otherwise positioned, held or disposed) between a user's eyes and an internal display of the optical sensing system. The prescription lenses may have a significant effect on user experience when utilizing the optical sensing system. For example, improper prescription lenses can distort images shown on the optical sensing system and can negatively impact user experience. Therefore, it can be advantageous to ensure that the correct prescription lenses are used within the optical sensing system.

In some embodiments, the presence of a first attachable lens (e.g., lens 150 in FIG. 1) on the optical sensing system can be determined, as shown in block 502. In some embodiments, the presence of the lens can be based on determining whether the first attachable lens has been attached to the optical sensing system, such as a lens being inserted into a slot of the optical sensing system or clipped onto the optical sensing system. In some embodiments, a notification can be displayed that the attachable lens has been attached or inserted (e.g., in response to detecting the presence of the lens). In some embodiments, the notification can additionally or alternatively include an audio notification or haptic feedback. The first attachable lens can be an insertable prescription lens, a removable prescription lens, a clip-on prescription lens, or the like, configured for use within the optical sensing system. The optical sensing system can be a head-mounted device configured to rest against a face of a user such as the system 100 shown in FIG. 1, or any other wearable device such as glasses, goggles, a visor, a mask, or a helmet. The optical sensing system can include a display for displaying an image to the user, such as display 110 in FIG. 1.

In some embodiments, block 502 can be performed once, repeatedly (e.g., periodically), based on a trigger, or upon user instruction (e.g., audio command to "please detect attached lenses"). In some embodiments, block 502 can be performed when the optical sensing system 100 or device 402 is enabled, during initialization of the system or device, or when the optical sensing system is placed on the head of the user. In some embodiments, the presence of multiple attachable lenses can be determined simultaneously. In some embodiments, the presence of the lens can be determined using the optical sensing system 100 (e.g., in a similar manner as or as part of the operations described with respect to block 504). In some embodiments, the presence of the lens can be determined using a sensor (e.g., an insertion sensor) that does not rely on optical measurements by the optical sensing system (e.g., a proximity sensor to detect an object less than a threshold distance from the optical sensing system, a force sensor configured to detect a threshold force by the insertion of presence of the lens, etc. optionally integrated into device 200).

In some embodiments, one or more lens characteristics of a first attachable lens can be determined using measurements by the optical sensing system, as shown in block 504. The one or more lens characteristics can include one or more of a diopter characteristic, a position, an orientation, and a presence of the first attachable lens. In some embodiments, determining the one or more lens characteristics of the first attachable lens can include producing a pattern of light using an arrangement of light sources, as shown in block 506, and detecting reflections in an image obtained via an image sensor, as shown in block 508. An image sensor can capture an image of the attachable lens including reflections caused by light being reflected from the lens. Different diopters (e.g., prescriptions) of the attachable lens can generate distinct arrangements of the reflections. In some embodiments, the absence of the lens can be determined by the absence of reflections that are expected when a lens is inserted. In some embodiments, the light sources can be IR lights arranged in an electronic device. The light sources can be in a 1D, 2D, or 3D arrangement. In some embodiments, the reflections can be from a front surface of the attachable lens, back surface of the attachable lens, or both.

In some embodiments, the image can be one or more images, each image including a depiction of at least a portion of the attachable lens. In some embodiments, the image sensor can include one or more image sensors that comprise a visible light image sensor, an infrared image sensor, a near-infrared image sensor, and/or an ultraviolet image sensor. The image sensor may capture additional data such as depth data.

In some embodiments, the one or more lens characteristics of the first attachable lens can be determined based on the detected reflections and a 3D spatial relationship between the image sensor and the arrangement of light sources. In some embodiments, the image sensor and arrangement of the light sources can be located at fixed relative positions in the optical sensing system. The 3D spatial relationship can be used to determine the lens characteristics based on the detected reflections. In some embodiments, the light sources can be LEDs and the image can depict the light reflections from each LED that are caused by the LED light path from the LED source reflected from the front surface and the back surface of the attachable lens to the image sensor.

In some embodiments, the system can determine, at block 512, whether the one or more lens characteristics (e.g., the diopter characteristic) of the first attachable lens is within or outside a threshold of a user-specified lens characteristic(s) (e.g., diopter characteristic). The user-specified characteristic can be from a previously enrolled lens (e.g., predetermined characteristic). For example, for the diopter characteristic, the threshold can be 0.05 diopters, 0.1 diopters, 0.25 diopters, 0.5 diopters, 1 diopter, etc. In some embodiments, the threshold can be a predetermined value or selected/tuned by the user. In some embodiments, the threshold can be 0.5 diopters (or less) or 1 diopter (or less), or any other suitable threshold depending on the prescription accuracy desired. However, it is understood that a wide range of thresholds can be used. In some embodiments, the determination can be based on comparing the one or more lens characteristics with the one or more user-specified lens characteristics (e.g., comparing a difference between the measured one or more lens characteristics and the one or more user-specified characteristics). In some embodiments, rather than determining the lens characteristic(s) at block 504 as discrete values (e.g., a discrete prescription, orientation, position, etc.), the determination of whether the one or more lens characteristics of a first attachable lens are within or outside a threshold of the user-specified lens characteristic(s) can include comparing an image (or a group of images) corresponding to the user-specified characteristic(s) with the image (or a group of images) measured using optical sensing system 100, and determining whether the location and/or arrangements of reflections match between the two images (or two groups of images) (e.g., the measured location and/or arrangements of reflections are within a threshold distance of the location and/or arrangements of reflections corresponding to the user-specified characteristics). In some such embodiments, the system determines whether there is a match or not a match (or a probability of a match, which can optionally be converted to a binary match/no-match determination using a threshold). As described herein, when there is a match, the system can verify the inserted lens matches the user-specified lens characteristics and the system can present further images calibrated to the user-specified lens characteristic at block 530. However, when there is no match with the user-specified lens characteristics, the system can search for alternative matches (and optionally switch the user-specified lens characteristic(s)) and/or prompt enrollment of a new lens, as described in more detail below.

In some embodiments, when the diopter characteristic of the first attachable lens is determined to be outside a threshold of a first user-specified diopter characteristic, the system can determine, as shown in block 514, whether the system has one or more additional enrolled lenses with one or more additional user-specified diopter characteristics. In some such embodiments, when additional lenses with additional user-specified diopter characteristics have been enrolled (e.g., lenses for reading books, reading music, working on a computer, or nearsightedness), the optical system can proceed to determine whether the diopter characteristic of the first attachable lens is within a threshold of one of the additional user-specified diopter characteristics. In some such embodiments, the optical system can compare an image (or a group of images) corresponding to each of the additional user-specified characteristic(s) with the image (or a group of images) measured using optical sensing system 100 (e.g., acquired at block 504), and determining whether the location and/or arrangements of reflections match between the pairs of images (or pairs of groups of images) in a similar manner as described above. In some embodiments, the optical system can perform the comparison serially (e.g., until a match is found) for each of the one or more additional enrolled lenses with one or more additional user-specified diopter characteristics. In some embodiments, the optical system can perform the comparison in parallel for multiple (or all) additional user-specified characteristics. In some embodiments, the determination of the lens characteristics at block 504 can be repeated for each comparison with an additional user-specified diopter characteristic. In some such embodiments, in accordance with a determination that the diopter characteristic of the first attachable lens matches or is within a threshold of an additional user-specified diopter characteristic (e.g., block 518), the user-specified diopter characteristic for the system can be switched from the first user-specified diopter characteristic to the additional user-specified diopter characteristic, as shown in block 520. In some embodiments, a notification of the determination that the diopter characteristic of the first attachable lens matches (or is within the threshold of) the additional user-specified diopter characteristic can be displayed, as shown in block 522. In some embodiments, the notification can additionally or alternatively include an audio notification or haptic feedback. In some embodiments, switching the user-specified diopter characteristic for the system can include an indication of a selection to switch from the first user-specified diopter characteristic to the additional user-specified diopter characteristic (e.g., user input received by the device including the optical sensing system. For example, a user may be given an option to switch the diopter characteristic for the system when the user intends to proceed with the lens that is currently inserted (but is a mismatch with the user-specified diopter characteristic for the system). When the user intends to use the current user-specified diopter characteristic for the system, but inserted the incorrect lens, the user can instead remove the physical lens and insert a different physical lens. In some embodiments, the user-specified diopter characteristic can be switched automatically without user input and/or without notifications.

In some embodiments, in accordance with a determination that additional lenses with additional user-specified diopter characteristics have not been enrolled (e.g., block 514) or in accordance with a determination that the diopter characteristic of the first attachable lens is outside the threshold of the additional user-specified diopter characteristic (e.g., block 518), a lens enrollment process can be initiated for the first attachable lens, as shown in block 516. The lens enrollment process can run locally on the optical sensing system 100 and/or device 200, as shown in FIG. 1, or remotely at a remote machine or server. The lens enrollment process can add the attachable lens to a list of user-specified lenses corresponding to the user-specified diopter characteristics. The lens enrollment process can associate the first attachable lens with a new user profile or an existing user profile. In some embodiments, a notification about the initiation of the enrollment process and/or a notification of the determination that the diopter characteristic of the first attachable lens is outside the threshold of the additional user-specified diopter characteristic can be displayed. In some embodiments, the notification can additionally or alternatively include an audio notification or haptic feedback. In some embodiments, the lens enrollment process can be initiated in response to an indication of a selection to initiate the lens enrollment process for the first attachable lens. Alternatively, the lens enrollment process can be initiated automatically without user input and/or without notifications.

In some embodiments, in accordance with completion of the lens enrollment process (e.g., at block 516) and optionally after repeating method 500 to verify the new lens enrollment, one or more images can be presented that are calibrated to the lens characteristics of the newly enrolled attachable lens (e.g., at block 516) or to the additional user-specified diopter characteristic to which the system switched (e.g., at block 520) in a similar manner as described with respect to block 530. For example, the one or more images can be calibrated to compensate for lens distortion based on the attachable lens diopter. In another example, the optical sensing system can validate the 3D position and/or orientation at which the attachable lens is attached within the optical sensing system. The optical sensing system can present the one or more images on a display housed within the optical sensing system or any other surface within the optical sensing system.

It is to be appreciated that while FIGS. 5A-5B primarily illustrate method 500 being used to detect mismatch between a user-specified diopter characteristic and the lens prescription, in some embodiments, method 500 can also be used to detect errors in lens orientation and position. In some embodiments, the optical sensing system can determine a presence of a single attachable lens or two attachable lenses (e.g., a right lens and a left lens). If two lenses are attached, in some embodiments, the two lenses can potentially be inserted in the wrong position (e.g., the right lens is in the left slot and the left lens is in the right slot). If either a single lens is attached or two lenses are attached, in some embodiments, the lens or lenses can potentially be attached at an incorrect orientation (e.g., rotated 180 degrees).

To determine if an attachable lens is in the correct orientation and position, a diopter characteristic of the attachable lens can be determined as shown in block 504 of FIG. 5A. When the diopter characteristic is determined to be outside a threshold of a first user-specified diopter characteristic (e.g., block 512, Yes branch), the system can first check for incorrect orientation and/or switching the positions of the right/left lenses by checking for a match with the image (or a group of images) corresponding to the first user-specified diopter characteristic with different orientation or position characteristics. The operations of determining lens characteristics (e.g., corresponding to block 504) and/or the comparison to determine a match (e.g., corresponding to block 512, but using a different combination of lens characteristics) can be repeated for different combinations of lens characteristics until the lens characteristic(s) are within the threshold or until the different combinations are exhausted for the first user-specified diopter characteristic. For example, the initial comparison can be between the image (or group of images) acquired from block 504 and the expected result image(s) using the first user-specified characteristic(s), the correct orientation, and the correct position. Subsequent comparisons can be between the image (or group of images) acquired from block 504 and the expected result image(s) using the first user-specified characteristic(s), but different combinations of correct or incorrect orientation(s) and position(s). When the diopter characteristic is within the threshold of the user-specified diopter characteristic after altering the orientation or the position, a notification can be displayed alerting a user that the orientation or the position of the lens is incorrect and/or providing instructions to re-orient or switch the lenses. In some embodiments, the notification can additionally or alternatively include an audio notification or haptic feedback. When the diopter characteristic is outside the threshold of the user-specified diopter characteristic even after altering the orientation or the position, the method can proceed to perform the remainder of method 500 (e.g., look for other matches for other enrolled lenses when appliable). When performing the remainder of method 500 (e.g., blocks 514-522 of FIGS. 5A-5B), different orientations and positions of the lenses can be considered when looking for matches between the inserted lens and additional user-specified diopter characteristics (e.g., considering position and orientation in addition to prescription at block 518).

Therefore, according to the above, some embodiments of the disclosure are directed to a method. The method can comprise: at an electronic device in communication with a display and an optical sensing system: determining one or more lens characteristics of a first attachable lens using measurements by the optical sensing system, the one or more lens characteristics including a diopter characteristic. In accordance with a determination that the diopter characteristic of the first attachable lens is outside a threshold of a first user-specified (e.g., predetermined, enrolled) diopter characteristic: in accordance with a determination that the diopter characteristic of the first attachable lens (matches or) is within a threshold of an additional user-specified diopter characteristic: the method can comprise switching from the first user-specified diopter characteristic to the additional user-specified diopter characteristic. In accordance with a determination that the diopter characteristic of the first attachable lens is outside a threshold of a first user-specified diopter characteristic: in accordance with a determination that the diopter characteristic of the first attachable lens is outside the threshold of the additional user-specified diopter characteristic: the method can comprise initiating a lens enrollment process for the first attachable lens. Additionally or alternatively to one or more of the embodiments disclosed above, in some embodiments, determining the one or more lens characteristics of the first attachable lens can comprise:

producing a pattern of light using an arrangement of light sources and detecting reflections in an image obtained via an image sensor. Additionally or alternatively to one or more of the embodiments disclosed above, in some embodiments, the one or more lens characteristics can include a position, an orientation, and/or a presence of the first attachable lens. Additionally or alternatively to one or more of the embodiments disclosed above, in some embodiments, the method can further comprise determining a presence of the first attachable lens based on determining whether the first attachable lens has been attached to the optical sensing system. Additionally or alternatively to one or more of the embodiments disclosed above, in some embodiments, the method can further comprise, in accordance with a determination that the diopter characteristic of the first attachable lens is within the threshold of the first user-specified diopter characteristic, presenting one or more images on the optical sensing system that are calibrated to the diopter characteristic of the first attachable lens. Additionally or alternatively to one or more of the embodiments disclosed above, in some embodiments, the first attachable lens can be a prescription lens. Additionally or alternatively to one or more of the embodiments disclosed above, in some embodiments, the method can further comprise displaying the first user-specified diopter characteristic and the additional user-specified diopter characteristic in a settings user interface on the electronic device. Additionally or alternatively to one or more of the embodiments disclosed above, in some embodiments, the method can further comprise, in accordance with the determination that the diopter characteristic of the first attachable lens matches or is within the threshold of the additional user-specified diopter characteristic: displaying, using the display, a notification of the determination that the diopter characteristic of the first attachable lens matches or is within the threshold of the additional user-specified diopter characteristic; and receiving, at the electronic device, an indication of a selection to switch the first user-specified diopter characteristic to the additional user-specified diopter characteristic. In accordance with a determination that the diopter characteristic of the first attachable lens is outside the threshold of the additional user-specified diopter characteristic: displaying, using the display, a notification of the determination that the diopter characteristic of the first attachable lens is outside the threshold of the additional user-specified diopter characteristic; and receiving, at the electronic device, an indication of a selection to initiate a lens enrollment process for the first attachable lens. Additionally or alternatively to one or more of the embodiments disclosed above, in some embodiments, the threshold of the first user-specified diopter characteristic can be 0.5 diopters (or less). Additionally or alternatively to one or more of the embodiments disclosed above, in some embodiments, the threshold of the first user-specified diopter characteristic is 1 diopter (or less).

Some embodiments of the disclosure are directed to an electronic device. The electronic can comprise a display, an optical sensing system, and one or more processors configured to perform any of the above methods. Some embodiments of the disclosure are directed to a non-transitory computer-readable storage medium storing instructions that, when executed by an electronic device with one or more processors, causes the electronic device to perform any of the above methods.

Some embodiments of the disclosure are directed to an electronic device. The electronic can comprise a display, an optical sensing system, one or more processors, and memory storing one or more programs configured for execution by the one or more processors. The one or more programs can include instructions for determining one or more lens characteristics of a first attachable lens using measurements by the optical sensing system, the one or more lens characteristics including a diopter characteristic. The one or more programs can further include instructions for, in accordance with a determination that the diopter characteristic of the first attachable lens is outside a threshold of a first user-specified diopter characteristic, in accordance with a determination that the diopter characteristic of the first attachable lens matches or is within a threshold of an additional user-specified diopter characteristic, switching the first user-specified diopter characteristic to the additional user-specified diopter characteristic. The one or more programs can further include instructions for, in accordance with a determination that the diopter characteristic of the first attachable lens is outside a threshold of a first user-specified diopter characteristic, in accordance with a determination that the diopter characteristic of the first attachable lens is outside the threshold of the additional user-specified diopter characteristic, initiating a lens enrollment process for the first attachable lens. Additionally or alternatively to one or more of the embodiments disclosed above, in some embodiments, determining the one or more lens characteristics of the first attachable lens can comprise: producing a pattern of light using an arrangement of light sources and detecting reflections in an image obtained via an image sensor. Additionally or alternatively to one or more of the embodiments disclosed above, in some embodiments, the one or more lens characteristics can include a position, an orientation, and/or a presence of the first attachable lens. Additionally or alternatively to one or more of the embodiments disclosed above, in some embodiments, the one or more programs can further include instructions for determining a presence of the first attachable lens based on determining whether the first attachable lens has been attached to the optical sensing system. Additionally or alternatively to one or more of the embodiments disclosed above, in some embodiments, the one or more programs can further include instructions for, in accordance with a determination that the diopter characteristic of the first attachable lens is within the threshold of the first user-specified diopter characteristic, presenting one or more images on the optical sensing system that are calibrated to the diopter characteristic of the first attachable lens. Additionally or alternatively to one or more of the embodiments disclosed above, in some embodiments, the first attachable lens can be a prescription lens. Additionally or alternatively to one or more of the embodiments disclosed above, in some embodiments, the one or more programs can further include instructions for displaying the first user-specified diopter characteristic and the additional user-specified diopter characteristic in a settings user interface on the electronic device. Additionally or alternatively to one or more of the embodiments disclosed above, in some embodiments, the one or more programs can further include instructions for, in accordance with the determination that the diopter characteristic of the first attachable lens matches or is within the threshold of the additional user-specified diopter characteristic: displaying, using the display, a notification of the determination that the diopter characteristic of the first attachable lens matches or is within the threshold of the additional user-specified diopter characteristic; and receiving, at the electronic device, an indication of a selection to switch the first user-specified diopter characteristic to the additional user-specified diopter characteristic. In accordance with a determination that the diopter characteristic of the first attachable lens is outside the threshold of the additional user-specified diopter characteristic: displaying, using the display, a notification of the determination that the diopter characteristic of the first attachable lens is outside the threshold of the additional user-specified diopter characteristic; and receiving, at the electronic device, an indication of a selection to initiate a lens enrollment process for the first attachable lens. Additionally or alternatively to one or more of the embodiments disclosed above, in some embodiments, the threshold of the first user-specified diopter characteristic can be 0.5 diopters (or less). Additionally or alternatively to one or more of the embodiments disclosed above, in some embodiments, the threshold of the first user-specified diopter characteristic is 1 diopter (or less).

Some embodiments of the disclosure are directed to a non-transitory computer readable storage medium. The non-transitory computer readable storage medium can store one or more programs. The one or more programs can comprise instructions, which when executed by one or more processors of an electronic device, can cause the electronic device to determine one or more lens characteristics of a first attachable lens using measurements by the optical sensing system, the one or more lens characteristics including a diopter characteristic. The one or more programs can further include instructions, which when executed by one or more processors of the electronic device, can cause the electronic device to, in accordance with a determination that the diopter characteristic of the first attachable lens is outside a threshold of a first user-specified diopter characteristic, in accordance with a determination that the diopter characteristic of the first attachable lens matches or is within a threshold of an additional user-specified diopter characteristic, switch the first user-specified diopter characteristic to the additional user-specified diopter characteristic. The one or more programs can further include instructions, which when executed by one or more processors of the electronic device, can cause the electronic device to, in accordance with a determination that the diopter characteristic of the first attachable lens is outside a threshold of a first user-specified diopter characteristic, in accordance with a determination that the diopter characteristic of the first attachable lens is outside the threshold of the additional user-specified diopter characteristic, initiate a lens enrollment process for the first attachable lens. Additionally or alternatively to one or more of the embodiments disclosed above, in some embodiments, determining the one or more lens characteristics of the first attachable lens can comprise: producing a pattern of light using an arrangement of light sources and detecting reflections in an image obtained via an image sensor. Additionally or alternatively to one or more of the embodiments disclosed above, in some embodiments, the one or more lens characteristics can include a position, an orientation, and/or a presence of the first attachable lens. Additionally or alternatively to one or more of the embodiments disclosed above, in some embodiments, the one or more programs can further include instructions, which when executed by one or more processors of an electronic device, can cause the electronic device to determine a presence of the first attachable lens based on determining whether the first attachable lens has been attached to the optical sensing system. Additionally or alternatively to one or more of the embodiments disclosed above, in some embodiments, the one or more programs can further include instructions, which when executed by one or more processors of an electronic device, can cause the electronic device to, in accordance with a determination that the diopter characteristic of the first attachable lens is within the threshold of the first user-specified diopter characteristic, present one or more images on the optical sensing system that are calibrated to the diopter characteristic of the first attachable lens. Additionally or alternatively to one or more of the embodiments disclosed above, in some embodiments, the first attachable lens can be a prescription lens. Additionally or alternatively to one or more of the embodiments disclosed above, in some embodiments, the one or more programs can further include instructions, which when executed by one or more processors of an electronic device, can cause the electronic device to display the first user-specified diopter characteristic and the additional user-specified diopter characteristic in a settings user interface on the electronic device. Additionally or alternatively to one or more of the embodiments disclosed above, in some embodiments, the one or more programs can further include instructions, which when executed by one or more processors of an electronic device, can cause the electronic device to, in accordance with the determination that the diopter characteristic of the first attachable lens matches or is within the threshold of the additional user-specified diopter characteristic: display, using the display, a notification of the determination that the diopter characteristic of the first attachable lens matches or is within the threshold of the additional user-specified diopter characteristic; and receive, at the electronic device, an indication of a selection to switch the first user-specified diopter characteristic to the additional user-specified diopter characteristic. In accordance with a determination that the diopter characteristic of the first attachable lens is outside the threshold of the additional user-specified diopter characteristic: display, using the display, a notification of the determination that the diopter characteristic of the first attachable lens is outside the threshold of the additional user-specified diopter characteristic; and receive, at the electronic device, an indication of a selection to initiate a lens enrollment process for the first attachable lens. Additionally or alternatively to one or more of the embodiments disclosed above, in some embodiments, the threshold of the first user-specified diopter characteristic can be 0.5 diopters (or less). Additionally or alternatively to one or more of the embodiments disclosed above, in some embodiments, the threshold of the first user-specified diopter characteristic is 1 diopter (or less).

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A method comprising:
   at an electronic device in communication with a display and an optical sensing system:
      determining one or more lens characteristics of a first attachable lens using measurements by the optical sensing system, the one or more lens characteristics including a diopter characteristic;
      determining that the diopter characteristic of the first attachable lens is outside a threshold of a first predetermined diopter characteristic;
      in accordance with a determination that the diopter characteristic of the first attachable lens is within a threshold of an additional predetermined diopter characteristic:
         switching from the first predetermined diopter characteristic to the additional predetermined diopter characteristic; and in accordance with a determination that the diopter characteristic of the first attachable lens is outside the threshold of the additional predetermined diopter characteristic:
    initiating a lens enrollment process for the first attachable lens.

2. The method of claim 1, wherein determining the one or more lens characteristics of the first attachable lens comprises:
producing a pattern of light using an arrangement of light sources; and
detecting reflections in an image obtained via an image sensor.

3. The method of claim 1, wherein the one or more lens characteristics include one or more of a position, an orientation, and a presence of the first attachable lens.

4. The method of claim 1, further comprising:
determining a presence of the first attachable lens using measurements by the optical sensing system or an insertion sensor.

5. The method of claim 1, further comprising:
in accordance with a determination that the diopter characteristic of the first attachable lens is within the threshold of the additional predetermined diopter characteristic:
    presenting one or more images on the optical sensing system that are calibrated to the additional predetermined diopter characteristic.

6. The method of claim 1, wherein the first attachable lens is a prescription lens.

7. The method of claim 1, further comprising:
displaying the first predetermined diopter characteristic and the additional predetermined diopter characteristic in a settings user interface on the electronic device.

8. The method of claim 1, further comprising:
in accordance with the determination that the diopter characteristic of the first attachable lens is within the threshold of the additional predetermined diopter characteristic:
    displaying, using the display, a notification of the determination that the diopter characteristic of the first attachable lens is within the threshold of the additional predetermined diopter characteristic; and
    receiving, at the electronic device, an indication of a selection to switch from the first predetermined diopter characteristic to the additional predetermined diopter characteristic; and
in accordance with a determination that the diopter characteristic of the first attachable lens is outside the threshold of the additional predetermined diopter characteristic:
    displaying, using the display, a notification of the determination that the diopter characteristic of the first attachable lens is outside the threshold of the additional predetermined diopter characteristic; and
    receiving, at the electronic device, an indication of a selection to initiate a lens enrollment process for the first attachable lens.

9. The method of claim 1, wherein the threshold of the first predetermined diopter characteristic is 0.5 diopters or less.

10. The method of claim 1, wherein the threshold of the first predetermined diopter characteristic is 1 diopter or less.

11. An electronic device comprising:
a display;
an optical sensing system;
one or more processors; and
memory storing one or more programs configured for execution by the one or more processors, the one or more programs including instructions for:
determining one or more lens characteristics of a first attachable lens using measurements by the optical sensing system, the one or more lens characteristics including a diopter characteristic;
determining that the diopter characteristic of the first attachable lens is outside a threshold of a first predetermined diopter characteristic;
in accordance with a determination that the diopter characteristic of the first attachable lens is within a threshold of an additional predetermined diopter characteristic:
    switching from the first predetermined diopter characteristic to the additional predetermined diopter characteristic; and
in accordance with a determination that the diopter characteristic of the first attachable lens is outside the threshold of the additional predetermined diopter characteristic:
    initiating a lens enrollment process for the first attachable lens.

12. The electronic device of claim 11, wherein determining the one or more lens characteristics of the first attachable lens comprises:
producing a pattern of light using an arrangement of light sources; and
detecting reflections in an image obtained via an image sensor.

13. The electronic device of claim 11, wherein the one or more lens characteristics include one or more of a position, an orientation, and a presence of the first attachable lens.

14. The electronic device of claim 11, wherein the one or more programs further include instructions for:
in accordance with a determination that the diopter characteristic of the first attachable lens is within the threshold of the additional predetermined diopter characteristic:
    presenting one or more images on the optical sensing system that are calibrated to the additional predetermined diopter characteristic.

15. The electronic device of claim 11, wherein the one or more programs further includes instructions for:
displaying the first predetermined diopter characteristic and the additional predetermined diopter characteristic in a settings user interface on the electronic device.

16. The electronic device of claim 11, wherein the one or more programs further includes instructions for:
in accordance with the determination that the diopter characteristic of the first attachable lens is within the threshold of the additional predetermined diopter characteristic:
    displaying, using the display, a notification of the determination that the diopter characteristic of the first attachable lens is within the threshold of the additional predetermined diopter characteristic; and
    receiving, at the electronic device, an indication of a selection to switch from the first predetermined diopter characteristic to the additional predetermined diopter characteristic; and in accordance with a determination that the diopter characteristic of the first attachable lens is outside the threshold of the additional predetermined diopter characteristic:
displaying, using the display, a notification of the determination that the diopter characteristic of the first attachable lens is outside the threshold of the additional predetermined diopter characteristic; and
receiving, at the electronic device, an indication of a selection to initiate a lens enrollment process for the first attachable lens.

17. A non-transitory computer readable storage medium storing one or more programs, the one or more programs comprising instructions, which when executed by one or more processors of an electronic device, cause the electronic device to:
determine one or more lens characteristics of a first attachable lens using measurements by an optical sensing system in communication with the electronic device, the one or more lens characteristics including a diopter characteristic;
determine that the diopter characteristic of the first attachable lens is outside a threshold of a first predetermined diopter characteristic;
in accordance with a determination that the diopter characteristic of the first attachable lens is within a threshold of an additional predetermined diopter characteristic:
switch from the first predetermined diopter characteristic to the additional predetermined diopter characteristic; and
in accordance with a determination that the diopter characteristic of the first attachable lens is outside the threshold of the additional predetermined diopter characteristic:
initiate a lens enrollment process for the first attachable lens.

18. The non-transitory computer readable storage medium of claim 17,
wherein determining the one or more lens characteristics of the first attachable lens comprises:
producing a pattern of light using an arrangement of light sources; and
detecting reflections in an image obtained via an image sensor.

19. The non-transitory computer readable storage medium of claim 17, wherein the one or more lens characteristics include one or more of a position, an orientation, and a presence of the first attachable lens.

20. The non-transitory computer readable storage medium of claim 17, wherein the one or more programs further includes instructions, which when executed by the one or more processors of the electronic device, cause the electronic device to:
in accordance with a determination that the diopter characteristic of the first attachable lens is within the threshold of the additional predetermined diopter characteristic:
present one or more images on the optical sensing system that are calibrated to the additional predetermined diopter characteristic.

* * * * *